(12) United States Patent
Edinger et al.

(10) Patent No.: US 8,887,644 B2
(45) Date of Patent: Nov. 18, 2014

(54) SELF-TENSIONING DRIVE BELT SYSTEM

(75) Inventors: Benjamin Booth Edinger, Grand Haven, MI (US); Jeffrey Dennis Roetman, West Olive, MI (US)

(73) Assignee: Herman Miller, Inc., Zeeland, MI (US)

( * ) Notice: Subject to any disclaimer, the term of this patent is extended or adjusted under 35 U.S.C. 154(b) by 134 days.

(21) Appl. No.: 13/366,819

(22) Filed: Feb. 6, 2012

(65) Prior Publication Data

US 2012/0199051 A1 Aug. 9, 2012

Related U.S. Application Data

(60) Provisional application No. 61/441,061, filed on Feb. 9, 2011.

(51) Int. Cl.
| | | |
|---|---|---|
| A47B 23/00 | (2006.01) | |
| F16H 19/06 | (2006.01) | |
| A47B 5/00 | (2006.01) | |
| F16H 19/00 | (2006.01) | |
| A47B 11/00 | (2006.01) | |

(52) U.S. Cl.
CPC ............ *A47B 5/006* (2013.01); *F16H 19/0672* (2013.01); *F16H 19/005* (2013.01); *A47B 11/00* (2013.01)
USPC .............................................. 108/42; 108/139

(58) Field of Classification Search
USPC .............. 108/42, 139, 48, 152, 108; 474/109, 474/101, 112, 115
See application file for complete search history.

(56) References Cited

U.S. PATENT DOCUMENTS

| | | | |
|---|---|---|---|
| 1,696,145 A | | 12/1928 | Wagoner |
| 1,815,954 A | * | 7/1931 | Opie .............................. 474/138 |
| 2,014,549 A | | 9/1935 | Behm |
| 2,680,314 A | | 6/1954 | Snyder |
| 2,713,437 A | * | 7/1955 | Broden ......................... 108/139 |
| 3,157,379 A | | 11/1964 | Platakis |
| 3,648,628 A | | 3/1972 | Davis |
| 4,085,961 A | * | 4/1978 | Brown .......................... 108/139 |
| 4,307,672 A | * | 12/1981 | Shikimi ........................ 108/139 |
| 4,449,172 A | | 5/1984 | Warshawsky |
| 4,480,556 A | * | 11/1984 | Wilson et al. ................... 108/48 |
| 4,672,898 A | | 6/1987 | Davidson |
| 4,706,575 A | | 11/1987 | Hamlin |
| 4,779,540 A | | 10/1988 | Dion et al. |
| 4,862,811 A | | 9/1989 | Davis |
| 4,863,124 A | * | 9/1989 | Ball et al. ........................ 108/28 |
| 4,974,808 A | | 12/1990 | Ball |
| 5,159,846 A | | 11/1992 | Warner |
| 5,328,415 A | | 7/1994 | Furutani et al. |
| 5,377,598 A | | 1/1995 | Kirchner et al. |
| 5,452,531 A | | 9/1995 | Graville et al. |

(Continued)

FOREIGN PATENT DOCUMENTS

| | | |
|---|---|---|
| WO | WO 03/024333 A1 | 3/2003 |
| WO | WO 2004/113168 A1 | 12/2004 |

*Primary Examiner* — Jose V Chen
(74) *Attorney, Agent, or Firm* — Brinks Gilson & Lione

(57) ABSTRACT

A self-tensioning drive belt system includes first and second gears rotatable relative to each other about a common first axis. A drive belt is fixedly secured to the first gear at a first location on the drive belt, and is fixedly secured to the second gear at a second location on the drive belt. A biasing member is disposed between the first and second gears. Various methods of using and assembling the self-tensioning drive system are also provided.

25 Claims, 5 Drawing Sheets

(56) References Cited

U.S. PATENT DOCUMENTS

| | | |
|---|---|---|
| 5,460,059 A | 10/1995 | Kato |
| 5,460,105 A | 10/1995 | Given, Jr. |
| 5,513,579 A | 5/1996 | Allan |
| 5,696,574 A | 12/1997 | Schwaegerle |
| 5,701,826 A | 12/1997 | Dodgen |
| 5,778,573 A | 7/1998 | Nottingham et al. |
| 5,951,423 A | 9/1999 | Simpson |
| 6,058,845 A * | 5/2000 | Kelm ............ 474/112 |
| 6,109,187 A | 8/2000 | Cottle et al. |
| 6,126,562 A | 10/2000 | Brangenfeldt |
| 6,158,359 A | 12/2000 | Allan et al. |
| 6,199,490 B1 | 3/2001 | Langer |
| 6,220,116 B1 | 4/2001 | Warner |
| 6,327,982 B1 | 12/2001 | Jackson |
| 6,361,459 B1 | 3/2002 | Serkh et al. |
| 6,484,648 B1 | 11/2002 | Long |
| 6,488,602 B1 * | 12/2002 | Ebert ............ 474/101 |
| 6,615,744 B1 | 9/2003 | Eckstein et al. |
| 6,786,461 B1 * | 9/2004 | Tsai et al. ............ 248/118.3 |
| 6,991,570 B2 * | 1/2006 | Serkh ............ 474/113 |
| 7,131,155 B1 | 11/2006 | Fernandez et al. |
| 7,229,374 B2 * | 6/2007 | Meckstroth et al. ............ 474/133 |
| 7,758,002 B2 * | 7/2010 | Blackburn ............ 248/278.1 |
| 8,523,721 B2 * | 9/2013 | Marica ............ 474/114 |
| 2005/0022702 A1 | 2/2005 | Hunter |
| 2006/0137578 A1 | 6/2006 | Noding |
| 2009/0101047 A1 | 4/2009 | Mulaw et al. |

* cited by examiner

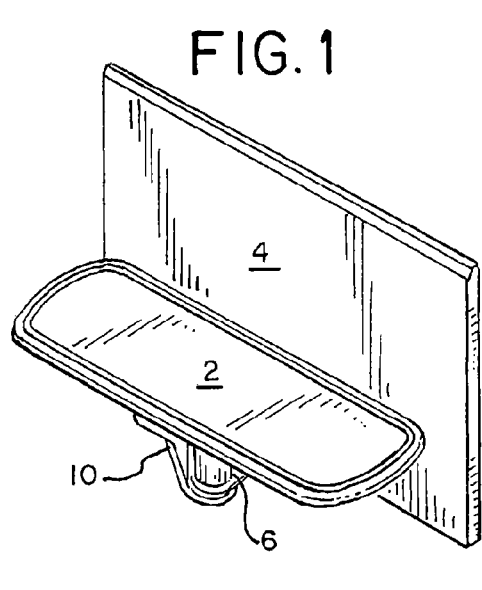
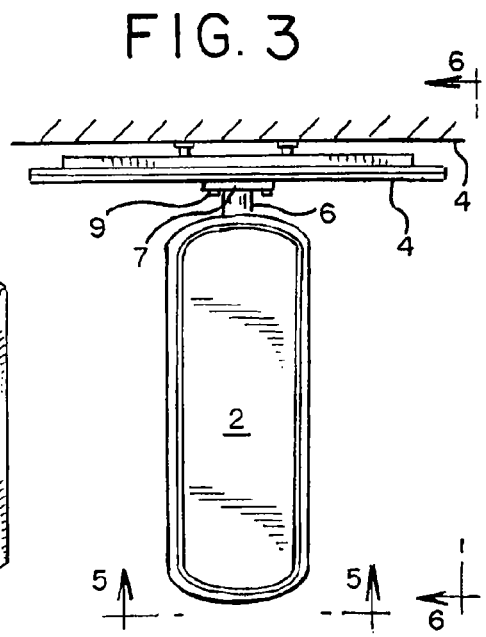
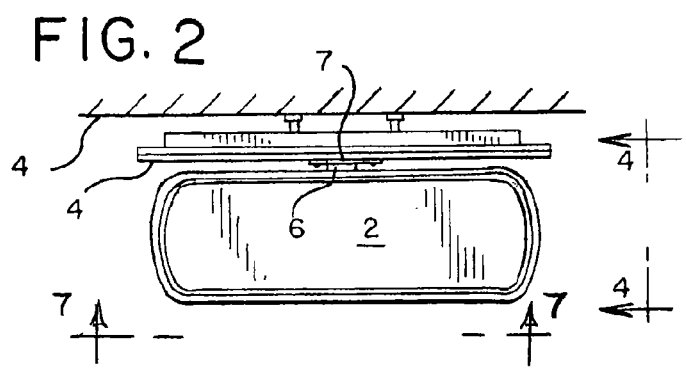
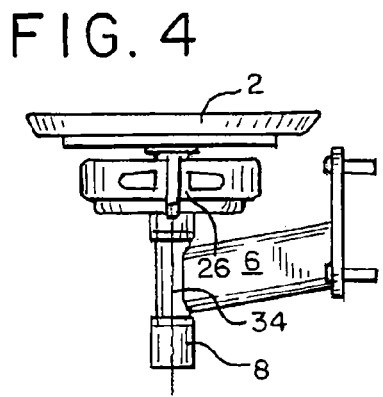
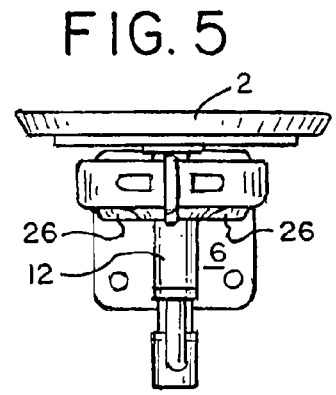

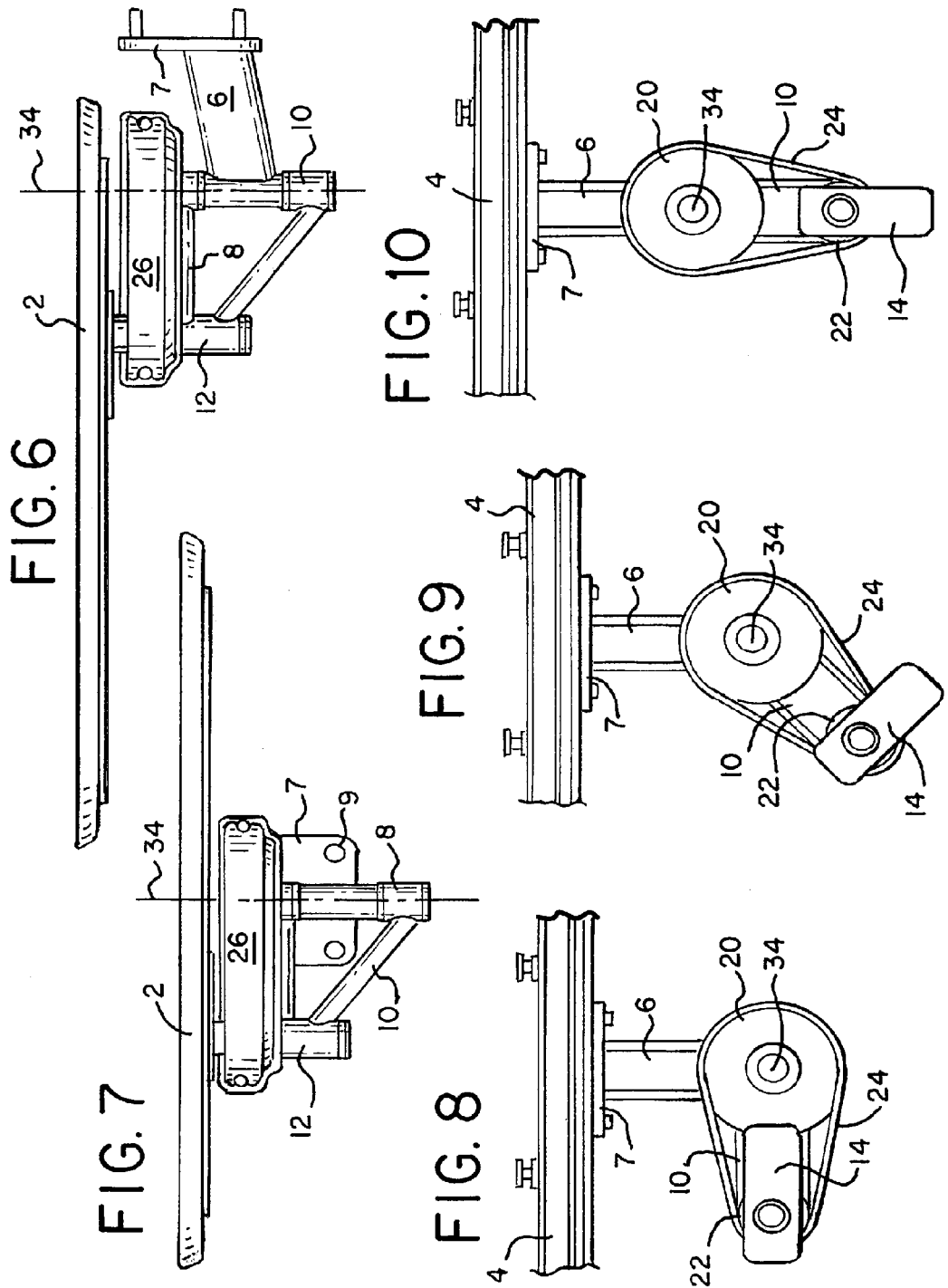

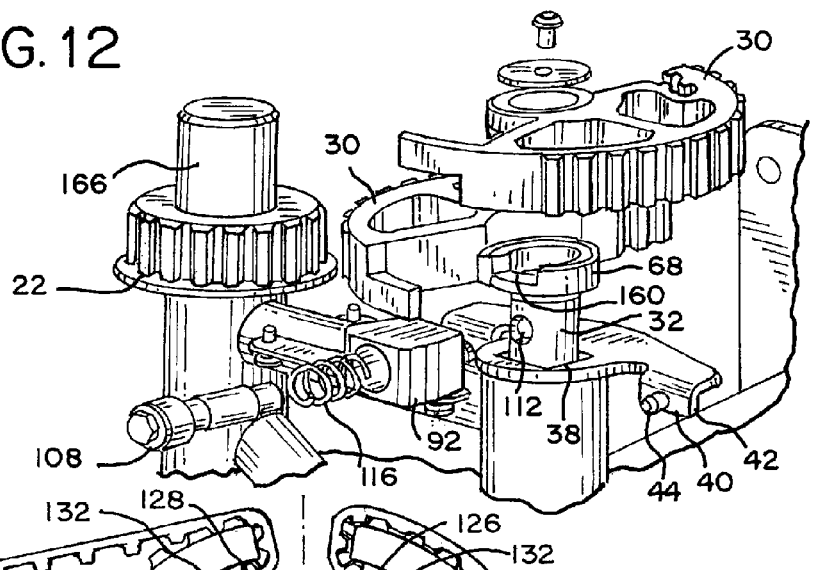
FIG. 12
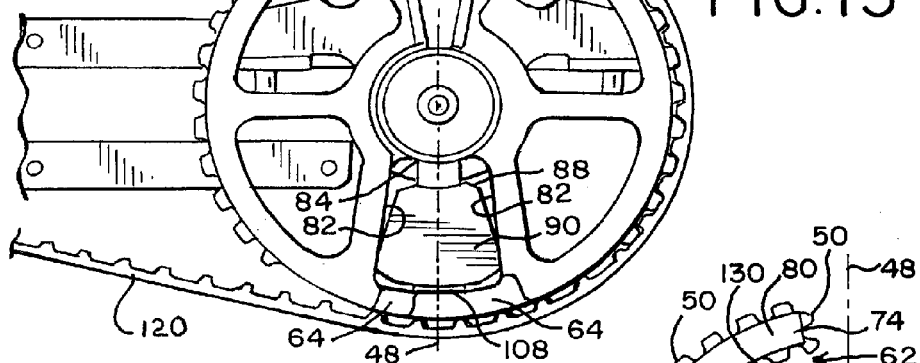
FIG. 13
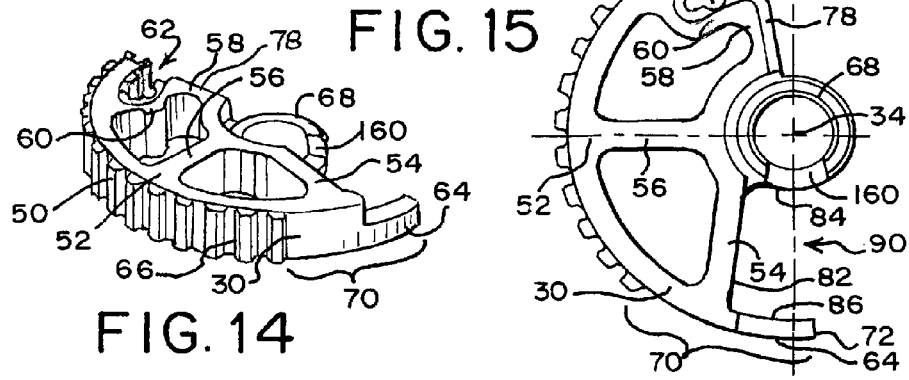
FIG. 14
FIG. 15

SELF-TENSIONING DRIVE BELT SYSTEM

This application claims the benefit of U.S. Provisional Application No. 61/441,061, filed Feb. 9, 2011, the entire disclosure of which is hereby incorporated herein by reference.

FIELD OF THE INVENTION

The present invention relates generally to a drive belt system, and in particular, to a self-tensioning drive belt system.

BACKGROUND

Drive belts typically couple at least a pair of gears, whether configured without teeth, i.e. as a pulley, or with teeth, i.e., as sprocket. In either situation, it may be important to maintain an appropriate tension in the drive belt, such that the drive belt maintains an appropriate friction force with, or applies an appropriate friction force to, the pulley, and/or avoids skipping teeth on the sprocket. Over time, the drive belt may stretch, thereby altering the amount of tension exerted on/by the belt, and thereby affecting the performance of the belt and gears.

In response, the tension of the belt may be maintained, or even altered as desired, by way of additional gears or other tensioning systems acting directly on the belt. These types of systems may cause additional wear on the belt, however, or require additional space to house the tensioning system. In addition, such systems typically require additional expensive and complex systems. Accordingly, the need remains for a reliable and simple self-tensioning system that is compact and does not expand the footprint of the drive system.

SUMMARY

The present invention is defined by the following claims, and nothing in this section should be considered to be a limitation on those claims.

In one aspect, one embodiment of a self-tensioning drive belt system includes first and second gears rotatable relative to each other about a common first axis. A drive belt is fixedly secured to the first gear at a first location on the drive belt, and is fixedly secured to the second gear at a second location on the drive belt. A third gear is rotatable about a second axis spaced from the first axis, wherein the third gear engages the drive belt between the first and second locations. A biasing member is disposed between the first and second gears. In various embodiments, the gears may be toothless, i.e., configured as pulleys, or may include a plurality of teeth, i.e., configured as sprockets.

In another aspect, one embodiment of a self-tensioning drive belt system includes first and second gears rotatable relative to each other about a common axis. A drive belt is fixedly secured to the first gear at a first location on the drive belt, and is fixedly secured to the second gear at a second location on the drive belt. A biasing member rotationally biases the first and second gears away from each other about the axis so as to maintain a predetermined tension in the drive belt.

Various methods of using and assembling the self-tensioning drive belt system are also provided. For example and without limitation, in one embodiment, a method for self-tensioning a drive belt includes reciprocally moving a drive belt in opposite first and second rotational directions relative to first and second gears rotatable relative to each other about a common axis, wherein the drive belt is fixed to each of the first and second gears at first and second locations respectively. The method further includes rotationally biasing the first and second gears away from each other with a biasing member so as to maintain a predetermined tension in the drive belt.

In yet another aspect, one embodiment of a worksurface assembly includes a non-rotatable first gear assembly defining a first axis, a drive member disposed and moveable around the first gear and a second gear assembly spaced from the first gear assembly and rotatable about a second axis. The drive member engages and is moveable around the second gear assembly. A work surface is non-rotatably fixed to the second gear assembly and is rotatable therewith about the first and second axes.

The various embodiments of the self-tensioning drive belt system, and the methods for the use and assembly thereof, provides significant advantages over other drive belt systems. For example and without limitation, the footprint of the system is not increased relative to a system configured without a tensioning device. Moreover, the system does not require a separate tensioning device acting on the drive belt, but rather tensions the belt through the gears themselves. Moreover, the gears themselves may be identical, further reducing manufacturing and inventory costs. This simple and compact system is reliable and easy to assemble and use.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 1 is a perspective view of a worksurface assembly in a parked position.

FIG. 2 is a top view of the worksurface assembly shown in FIG. 1.

FIG. 3 is a top view of the worksurface assembly in a fully deployed position.

FIG. 4 is a side view of the worksurface assembly shown in FIG. 2 taken along lines 4-4.

FIG. 5 is a front view of the worksurface assembly shown in FIG. 3 taken along lines 5-5.

FIG. 6 is a side view of the worksurface assembly shown in FIG. 3 taken along lines 6-6.

FIG. 7 is a front view of the worksurface assembly shown in FIG. 2 taken along lines 7-7.

FIG. 8 is a top view of one embodiment of a rotation mechanism in a parked position.

FIG. 9 is a top view of one embodiment of a rotation mechanism in a partially deployed position.

FIG. 10 is a top view of one embodiment of a rotation mechanism in a fully deployed position.

FIG. 12 is a partial enlarged, exploded view of one embodiment of a rotation mechanism configured with a self-tensioning drive belt system.

FIG. 13 is a top, partial view of a rotation mechanism configured with a self-tensioning drive belt system.

FIG. 14 is a perspective view of one embodiment of a gear segment.

FIG. 15 is a top view of the gear segment shown in FIG. 14.

DETAILED DESCRIPTION OF THE PRESENTLY PREFERRED EMBODIMENTS

Figure 11:
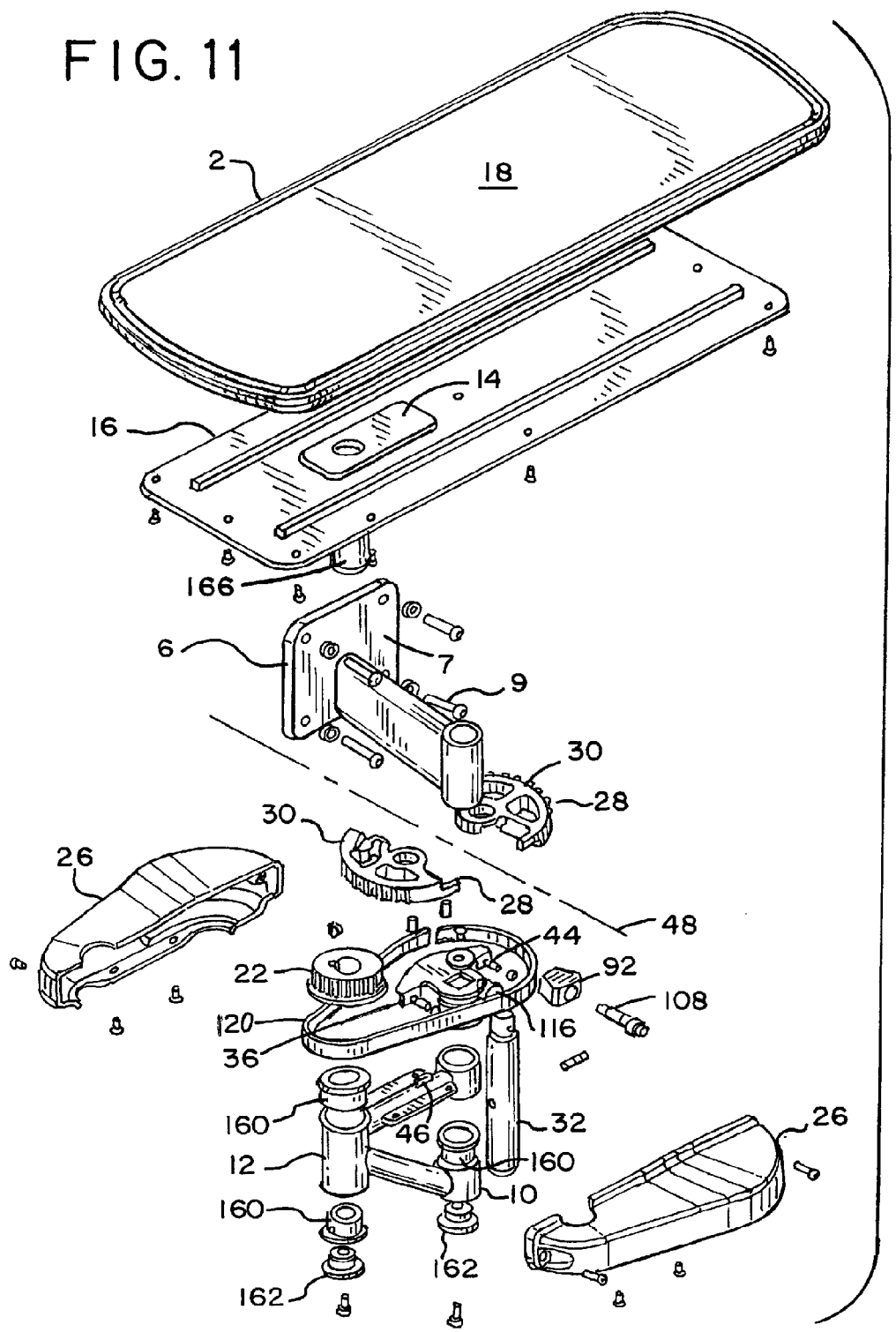
FIG. 11 is an exploded, perspective view of a worksurface assembly.
Figure 16:
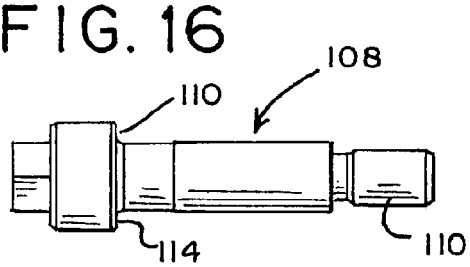
FIG. 16 is a side view of a clamping member.
Figure 17:
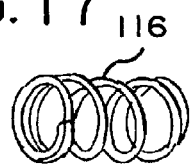
FIG. 17 is a perspective view of a spring.
Figure 18:
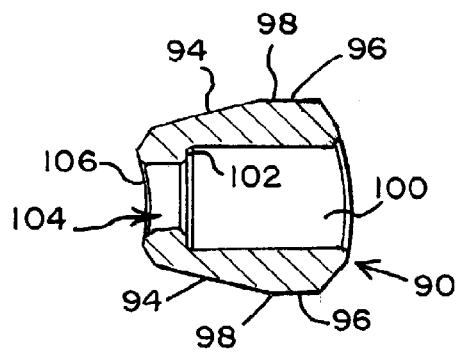
FIG. 18 is a cross-sectional view of a wedge.
Figure 19:
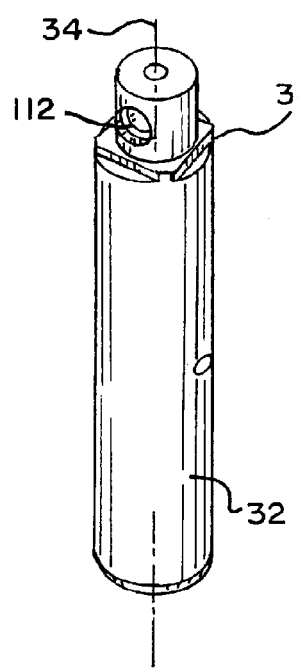
FIG. 19 is a perspective view of a spindle.

It should be understood that the term "plurality," as used herein, means two or more. The term "longitudinal," as used herein means of or relating to length or the lengthwise direction. The term "lateral," as used herein, means sideways, or substantially perpendicular to the longitudinal direction. The term "coupled" means connected to or engaged with, whether directly or indirectly, for example with an intervening member, and does not require the engagement to be fixed or permanent, although it may be fixed or permanent. The term "transverse" means extending across an axis, and/or substantially perpendicular to an axis. It should be understood that the use of numerical terms "first," "second," "third," etc., as used herein does not refer to any particular sequence or order of components; for example "first" and "second" gear segments may refer to any sequence of such segments, and is not limited to the first and second gear segments of a particular configuration unless otherwise specified.

Referring to FIGS. 1-7, an articulated worksurface is moveable between a parked position (FIG. 1), wherein an elongated worksurface 2 extends parallel along an adjacent wall 4, and a deployed position (FIG. 3), wherein the worksurface extends substantially perpendicular to the wall. The wall may be a permanent architectural wall, or a manufactured wall, such as a partition wall, or some combination thereof. The worksurface 2 is unhanded, meaning it can rotate in either direction from the deployed position and assume the same parked position regardless of which direction the worksurface was rotated, i.e. clockwise or counterclockwise. In this way, the worksurface can be used as a conventional desk in either position, or any position therebetween. At the same time, when in the deployed position, a pair of users may be positioned on opposite sides of the worksurface 2, for example to engage in conversation or game playing. Or, a single user may use the worksurface in the fully deployed position without having to face the wall, which provides the user with a view/vantage point of the entire room. When not in use, the worksurface 2 can be moved to the less obstructive parked position adjacent to and along the wall or other supporting structure. The work surface may include a lower support member 16 and an upper interface member 18.

The assembly includes a primary support arm 6 fixed to a wall or other support surface, for example with a plate 7 and fasteners 9. A first end 8 of a secondary support arm 10 is pivotally mounted to the primary support arm 6, while a worksurface support plate 14 is pivotally mounted to a second end 12 of the secondary support arm. The worksurface 2 is secured to the support plate 14. A main pivot gear 20 is non-rotatably mounted to the primary support arm. A pinion gear 22 is fixedly and non-rotatably secured to the support plate 14. Either the main or pinion gears 20, 22 may be configured without teeth, e.g., as a pulley, or with teeth, e.g., as a sprocket (which includes spur gears) etc., as shown for example in FIGS. 12, 13, 20 and 21. The secondary support arm is supported on the main pivot arm with a pair of bushings 160, while the support plate and pinion gear are supported on the secondary support with a pair of bushings 160, captured between a stem 166 extending downwardly from the plate and a plug 162. The stem 166 and gear 22 have interfacing key and keyhole elements to prevent the rotation of the pinion gear relative to the stem and support plate 14. In one embodiment, a chain, toothed belt or other looped interface 24, is wrapped around the main pivot gear 20 and pinion gear 22. A two-piece housing 26, or shroud, is disposed around and covers the gears and looped interface to reduce the possibility of injury, and to improve the aesthetics of the system. The housing pieces may be secured one to the other with fasteners, a snap-fit, or combinations thereof.

As the worksurface 2 is manipulated and rotated, for example by a user grasping and moving the worksurface 2, the support plate 14 and pinion gear 22 are rotated therewith, thereby driving the movement of the second support arm 10 and chain/belt 24. In this way (see FIGS. 8-10), the support plate 14 and worksurface (not shown) are rotated from the parked position parallel to a support wall 2 to the deployed position perpendicular to the support wall 4. Of course, it should be understood that the mechanism can be integrated and secured to devices other than a support wall, including for example and without limitation, a cabinet, frame, desk, portable unit, etc.

Referring to FIGS. 11-21, one embodiment of the rotation mechanism includes a self-tensioning drive system. In this embodiment, the main pivot gear 28 is configured as a pair of gear segments 30 that are rotatable relative to each other about a spindle 32 defining a rotation axis 34. A stop device 36, configured as a bracket, is non-rotatably secured to the end of the spindle, for example by way of polygonal socket interface 38, shown as a square although other polygons would also be suitable. The bracket has a pair of arms 40 extending laterally from the spindle in opposite directions. Each arm has an end portion 42 configured with an adjustable stop member 44, shown as set screws. The set screws are parallel in one embodiment, and spaced from the axis. The stop members 44 engage a stop surface on the support arm 10, for example a stop tab 46. In this way, the interface of the stop member with the stop tab limits the rotation of the worksurface relative to the wall in either rotational direction. The position of the stop members 44 can be adjusted to ensure that the worksurface is parallel to the wall in the parked position, regardless of whether the support arm 10 is in the left or right orientation.

In one embodiment, the gear segments 30 are identical, but with one of the gear segments being rotated 180 degrees about an axis 48 perpendicular to the spindle axis 34 such that the two segments are arranged to simulate a main pivot gear having an outer circumferential surface formed approximately 360 degrees about the axis 34. Each gear segment 30 has a plurality of teeth 50 formed around at least a portion of semi-circular peripheral surface 66 formed on a rim portion 52 of the gear segment. A remainder 70 of the peripheral surface is substantially smooth. The rim portion 52 terminates on one side in an arm portion 64 having a free end 72. An opposite end of the rim portion also terminates in an arm portion 80 having a free end 74. A plurality of spokes 54, 56, 58, shown as three, connects the rim portion 52 with a hub portion 68. One of the spokes 58 has a radial portion 78 and a circumferential portion 60 positioned between the hub 68 and the rim 52, so as to form a groove 62 between the circumferential portion 60 and the arm portion 80 of the rim 52. The groove 62 and arm portion 80 are configured with teeth 50 spaced therealong. The arm portion 64 and hub 68 have a thickness less than the remainder of the rim portion 52, with an inner surface of both the arm portion 64 and hub 68 being proximate the centerline of the rim portion 52. The hub 68 includes a radially extending opening 160 facing the arm portion 64.

During assembly, the gear segments 30 are rotated relative to each other and positioned with the hub portions 68 and arm portions 64 overlapping, and with the opposite arm portions 80 being slightly spaced apart as shown in FIG. 13. The hub portions are disposed over the spindle 32. The outer surface 84 of a portion of the hubs 68, the inner surfaces 82 of the spokes and the inner surface 86 of the arm portions forms a cavity 88. The inner surfaces 82 of the spokes 54 are angled relative to each other, forming various angles relative to each other depending on the rotation position of the gear segments 30 relative to each other. For example, in various suitable embodiments, the angle between surfaces may vary between about 14.5-18 degrees.

Referring to FIGS. 11-19, a biasing member 90 is disposed in the cavity between the first and second gears. In one embodiment, the biasing member 90 is configured as a spring loaded wedge member 92. In other embodiments, the biasing device may be configured as a spring, whether a tension, compression or cantilever spring, acting directly on and between the gear members. Referring to FIGS. 11-19, each side of the wedge member 92 has tapered, or angled side surfaces 94 that form an apex 98 with side surfaces 96 on each side of the wedge member. In a preferred embodiment, the side surfaces 94, 96, or apex 98, translate, e.g., slide, along the surfaces 82 of the spokes 54, acting as engagement surfaces. Depending on the angles between the surfaces of the spokes and/or wedge sides, in one alternative embodiment, the wedge and/or spokes may be provided with rollers at the interface thereof, e.g., rolling, of the wedge relative to the gear segments. In one embodiment, the walls 94 are formed at an angle of about 30.3 degrees, while the walls 96 are substantially parallel.

The wedge member 92 includes an interior cavity 100 defining a load bearing surface 102, configured as an interior shoulder. An opening extends 104 between the cavity and an inner, end surface 106 of the wedge, which is curved to mate with an outer surface of the hub when the wedge is biased to a radially inwardmost position. A load bearing member 108, shown as a shoulder bolt, is disposed in the cavity and has an end portion 110 threadably engaged with an opening 112 in the spindle 32. The end portion extends through the opening 160 of the hub such that it can engage the spindle 32. The load bearing member 108 has a load bearing surface 114, configured as a shoulder. A spring 116, shown as a compression spring, is disposed between the two load bearing surfaces 102, 114 and biases the wedge member 92 radially inwardly toward the spindle 32, and thereby applies a biasing force to the gear segments 30, biasing them rotationally away from each other at the location of the wedge 90, and toward each other on the opposite side adjacent the arm portions 80. Because the spindle 32 is non-rotatable, the wedge member 92 is also non-rotatable about the axis 34. At the same time, the gear segments 30 may rotate toward and away from each other about the axis 34, depending on the radial location of the wedge 92, but the segments in combination, i.e., when forming a main pivot gear, are non-rotatable in the same direction, whether clockwise or counterclockwise, due to non-rotational configuration of the wedge 90. In this sense, the main pivot gear 28, which includes the gear segments 309, is "non-rotatable" about the axis 34, even though the component parts thereof, i.e., the gear segments 30, are rotatable toward and away from each other in opposite rotational directions depending on the position of the wedge member 92. In one embodiment, the gear segments 30, in combination, have a 2:1 gear ratio with the pinion gear 22.

Figure 21:
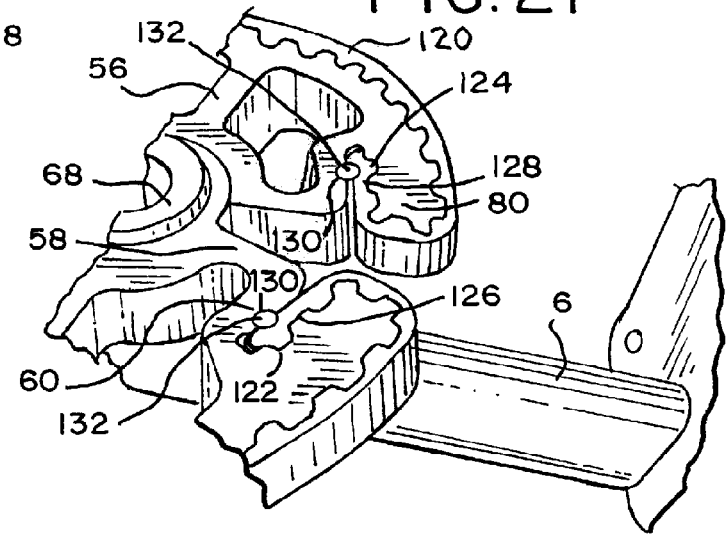
FIG. 21 is a partial top, perspective view of a self-tensioning drive belt system.
Figure 20:
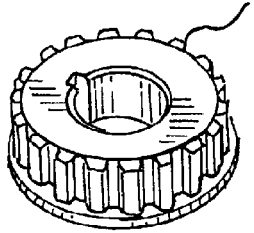
FIG. 20 is a perspective view of a gear.

A drive belt 120 is connected to the first and second gear segments at first and second locations 122, 124. In one embodiment, the first and second locations are defined by the grooves 62, with the drive belt 120 being interrupted and having a first end portion 126 anchored in one groove and an opposite second end portion 128 anchored in the other groove. In one embodiment, a recess 130 or groove is formed in each of the circumferential portion 60 of the spokes, with splines 132 inserted longitudinally in the grooves 130 to secure the end portions of the belt as shown in FIG. 21. In other embodiments, the belt may remain looped, but with first and second portions thereof being fixedly secured to the first and second gear segments respectively. The term "drive belt" means a flexible length of material, including without limitation a cogged timing belt, chain, toothless pulley belts (V and flat), etc., and may be made of various materials suitable for such belts, including without limitation, rubber, neoprene, fiberglass, nylon, and/or combinations thereof.

In operation, the drive belt 120 is reciprocally moved in opposite first and second rotation directions relative to the first and second gears, for example as described above by rotating a work surface 2 and attached pinion gear 22, which drives the belt. Of course, it should be understood that the self-tensioning drive belt system is not limited to the disclosed worksurface arrangement, but may be used with any rotation mechanism application having first and second gears connected with a drive belt, so long as the relative rotation between the drive belt and first/second gears, or wrapping of the drive belt around the first and second gears, is less than or equal to about 270 degrees, and more preferably less than or equal to about 180 degrees.

Over time, as the drive belt is stretched or elongated, or due to tolerances looses tension, the wedge member 92 is biased radially inwardly, which in turn biases the first and second gears 30 away from each other at the location of the wedge member, with the opposite arm portions 80 being biased toward each other. Due to the wrap of the drive belt 120, the movement of the arm portions 80 toward each other increases the tension in the drive belt 120 to a predetermined level, which depends on the spring rate of the spring 116 and the shape and materials of wedge member 92, and corresponding engagement surfaces of the gears. Because the portions of the drive belt 120 on either side of the pinion gear are only engaged with the teeth on one of the gears, due to the smooth surface portion 70 at the interface of the gears adjacent the arm portions 64, the movement of the gears toward and away from each other does not interfere with the meshing of the drive belt 120 with the teeth 50 on each gear 30. Rather, the meshing is keyed off from the anchored end. In one embodiment the gear segments 30, wedge member 92 and pinion gear 22 are made of powdered metal (FC-0208-50), while the drive belt 120 is made of Neoprene with fiberglass cording. The drive belt is configured with teeth having the same pitch as the gear segments 30 and pinion gear 22 such that they meshingly mate one with the other.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:
1. A self-tensioning drive belt system comprising:
first and second gears configured as first and second sprocket segments rotatable relative to each other about a common first axis;
a drive belt fixedly secured to said first sprocket segment at a first location on said drive belt, and said drive belt fixedly secured to said second sprocket segment at a second location on said drive belt;
a third gear rotatable about a second axis spaced from said first axis, wherein said third gear engages said drive belt between said first and second locations; and
a biasing member disposed between and engaging said first and second sprocket segments, said biasing member rotationally biasing said first and second sprocket segments away from each other about said axis so as to maintain a predetermined tension in said drive belt.

2. The self-tensioning drive belt system of claim 1 wherein said first and second axes are parallel.

3. The self-tensioning drive belt system of claim 1 wherein said first and second sprocket segments are configured with the same shape, wherein said first and second sprockets segments are rotated 180 degrees relative to each other about an axis extending substantially perpendicular to said first axis wherein said first and second segments lie in the same plane.

4. The self-tensioning drive belt system of claim 1 wherein said biasing member comprises a wedge, and wherein each of said sprocket segments comprises an engagement surface engaging said wedge.

5. The self-tensioning drive belt system of claim 4 further comprising a spring biasing said wedge radially inwardly toward said first axis.

6. The self-tensioning belt system of claim 5 further comprising a load bearing member supporting one end of said spring, wherein an opposite end of said spring engages said wedge.

7. The self-tensioning belt system of claim 6 wherein said load bearing member is coupled to an axle disposed along said first axis.

8. The self-tensioning drive belt system of claim 1 wherein said drive belt is interrupted, said drive belt comprising a first end portion defining said first location and a second end portion defining said second location.

9. The self-tensioning drive belt system of claim 1 further comprising a work surface coupled to and rotatable with said third gear.

10. A self-tensioning drive belt system comprising:
first and second gears configured as first and second sprocket segments rotatable relative to each other about a common axis;
a drive belt fixedly secured to said first sprocket segment at a first location on said drive belt, and said drive belt fixedly secured to said second sprocket segment at a second location on said drive belt; and
a biasing member engaging and rotationally biasing said first and second sprocket segments away from each other about said axis so as to maintain a predetermined tension in said drive belt.

11. The self-tensioning drive belt system of claim 10 wherein said biasing member comprises a wedge.

12. The self-tensioning drive belt system of claim 11 further comprising a spring biasing said wedge radially inwardly toward said axis.

13. The self-tensioning drive belt system of claim 10 wherein said drive belt is interrupted, said drive belt comprising a first end portion defining said first location and a second end portion defining said second location.

14. A method for self-tensioning a drive belt comprising:
reciprocally moving a drive belt in opposite first and second rotational directions relative to first and second gears configured as first and second sprocket segments rotatable relative to each other about a common axis, wherein said drive belt is fixed to each of said first and second sprocket segments at first and second locations respectively; and
rotationally biasing said first and second sprocket segments away from each other with a biasing member so as to maintain a predetermined tension in said drive belt.

15. The method of claim 14 wherein said biasing member comprises a wedge, and wherein said rotationally biasing said first and second sprocket segments comprises engaging opposing engagement surfaces on said first and second sprocket segments with said wedge.

16. The method of claim 15 further comprising biasing said wedge radially inwardly toward said axis with a spring.

17. The method of claim 14 wherein said axis comprises a first axis, and further comprising reciprocally rotating a third gear about a second axis spaced from said first axis with said drive belt.

18. The method of claim 17 further comprising providing a support member extending between said first and second axes, and rotating said support member about said first axis.

19. The method of claim 14 wherein said drive belt is interrupted and comprises a first end portion fixedly connected to said first sprocket segment at said first location and a second end portion fixedly connected to said second sprocket segment at said second location.

20. A worksurface assembly comprising:
a non-rotatable first gear assembly defining a first axis;
a drive member engaging and moveable around said first gear assembly;
a second gear assembly spaced from said first gear assembly and rotatable about a second axis, wherein said drive member engages and is moveable around said second gear assembly; and
a work surface non-rotatably fixed to said second gear assembly and rotatable therewith about said first and second axes between first and second positions.

21. The worksurface assembly of claim 20 wherein said first gear assembly comprises first and second gear segments rotatable relative to each other in opposite directions about said first axis, but wherein said first and second gear segments in combination are non-rotatable in the same direction about said first axis, whether clockwise or counterclockwise.

22. The worksurface assembly of claim 21 wherein said drive member comprises an interrupted drive belt having a first end portion connected to said first gear segment and a second end portion connected to said second gear segment.

23. The worksurface assembly of claim 20 further comprising a support member extending between said first and second axes.

24. The worksurface assembly of claim 20 wherein said first gear assembly comprises a main gear, and wherein said second gear assembly comprises a pinion gear.

25. The self-tensioning drive belt system of claim 1 further comprising a support member extending between said first and second axes.

* * * * *